March 10, 1942.    C. W. BONDURANT    2,276,014

THERMOSTATIC CONTROL MECHANISM

Filed Dec. 11, 1939

INVENTOR
CARLTON W. BONDURANT
BY
*Hyde and Meyer*
ATTORNEYS

Patented Mar. 10, 1942

2,276,014

UNITED STATES PATENT OFFICE 2,276,014

THERMOSTATIC CONTROL MECHANISM

Carlton W. Bondurant, Euclid, Ohio, assignor to The Titan Valve & Manufacturing Company, Cleveland, Ohio, a corporation of Ohio Application December 11, 1939, Serial No. 308,595

2 Claims. (Cl. 236—81)

This invention relates to improvements in thermostatic control mechanism and more particularly to one in which two valves are substantially simultaneously controlled to close one as the other is opened and the invention relates to improved structure whereby the desired results are obtained.

My invention is applicable to a combination of a thermostatically controlled over-center snap acting device and a pair of valves controlled thereby to open one valve as the other valve is closed. One object of my invention is to hold one of said valves definitely closed until the over-center device has passed a central balanced position and is ready to snap over center.

Another object of my invention is to provide a lost motion connection between the valves so that one valve may remain closed while the snap acting device is approaching and passing its central or snap-over position, after which both valves move quickly during the snap action.

Another object of the present invention is to provide a novel combination between a pair of thermostatically controlled valves and a diaphragm valve so that movement of the diaphragm valve is efficiently controlled by the thermostatic device without unnecessary loss of gas used in the control operation, and to prevent undesired movements of the diaphragm valve.

Other objects and advantages of the present invention will be apparent from the accompanying drawing and description and the essential features will be set forth in the claims.

Figure 1:
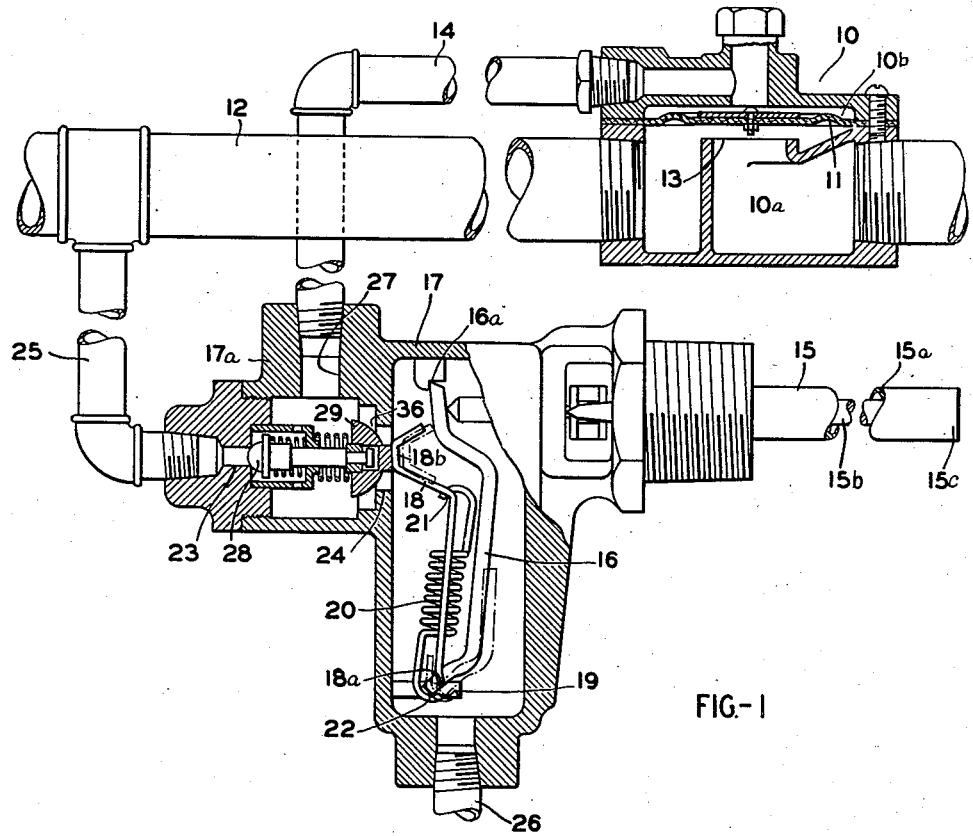
Figure 2:
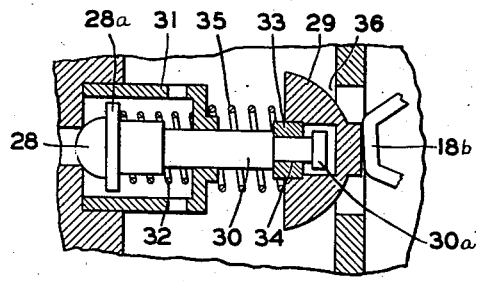
Figure 3:
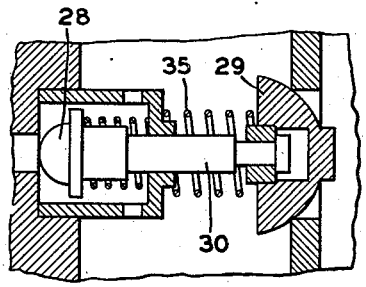

In the drawing, Fig. 1 is a diagrammatic view showing the combination between a diaphragm valve and my improved thermostatically controlled device, most of the parts being cut away or in section to more clearly show the operation thereof; Fig. 2 is an enlarged view of a portion of the mechanism of Fig. 1; while Fig. 3 is a view similar to Fig. 2 showing the position of the parts after the snap acting device has moved over center to an opposite position.

My invention is particularly applicable for use with a diaphragm valve such as that shown and indicated generally at 10 comprising a casing divided into a lower chamber 10a and an upper chamber 10b by a diaphragm 11. The lower chamber is connected in series with a main gas supply line 12 and includes a valve seat 13. A conduit 14 leads from chamber 10b to a source of gas supply at the same pressure as that in the main 12 and the action of the diaphragm valve as is generally understood is to close against the seat 13 when the gas pressure is equal in chambers 10a and 10b. When the pressure is relieved in chamber 10b as by bleeding through conduit 14, then the greater pressure in chamber 10a will open the diaphragm valve. Those familiar with this art will realize that one useful application of the combination here disclosed is the opening and closing of the gas supply through conduit 12 to some heating device in response to movements of the thermostat 15 which is subjected to the temperature of some medium heated by the burner supplied through pipe 12. For instance in a warm air furnace whose burner is supplied in response to movements of the diaphragm valve 10, the thermostat 15 might be placed in an air chamber of the furnace in such a manner that when the thermostat 15 is heated beyond a predetermined point it will act to close the diaphragm valve and vice versa when the temperature about the thermostat 15 drops below a predetermined point then the diaphragm valve 10 would be opened to again supply heat to the furnace. All of this is well known in the prior art and is only mentioned here to illustrate one useful application of my improved control mechanism.

The thermostatic device here shown comprises a thermostatic element of well known type comprising a tube 15a having a relatively large coefficient of expansion and a rod 15b of material having a relatively small coefficient of expansion. The two are fastened together at the end 15c so that when the tube is cold and contracts, the rod 15b is moved toward the left, and when the tube is heated and expands, the rod moves to the right as viewed in Fig. 1. The snap acting device controlled by the thermostatic element comprises a primary lever 16 fulcrumed at 16a on an abutment of the casing 17 and a secondary lever 18 which is bifurcated at its lower end and fulcrumed at 18a on a pair of laterally spaced abutments 19 on the casing 17. A tension spring 20 is connected between point 21 on lever 18 and point 22 on lever 16. The spring thus holds each lever against its fulcrum and holds the lever 18 toward the left as viewed in Fig. 1 when the line connecting points 21 and 22 lies to the left of point 18a. When the levers move so as to cause the line between points 21 and 22 to move to the right of point 18a, the spring 20 causes the lever 18 to snap over center from the full line position of Fig. 1 to the dot-dash position there shown. This is a known form of over-center snap acting device.

Casing means 17a (in the present instance integral with casing 17) is provided having valved openings 23 and 24. Opening 23 is connected by conduit 25 with the gas main 12 and opening 24 leads into the hollow space of casing 17 which is provided with an outlet opening and conduit 26. The casing means 17a has a third opening 27 which is connected by conduit 14 with chamber 10b of the diaphragm valve. Valves 28 and 29 are provided for controlling the openings 23 and 24 respectively. These valves are provided with common connecting means arranged so that one valve is closed as the other valve is opened. The portion 18b of lever 18 through valve 29 engages the common connecting means so as to control the movements of the valves.

The common connecting means for valves 28 and 29 comprises a valve stem 30 on which the valve 28 is rigidly mounted. A sleeve 31 fixed to the casing means 17a guides the stem 30 and serves as an abutment for the compression spring 32 which engages against the shoulder 28a so as to urge valve 28 toward its seat. Valve 29 has pressed therein a U-shaped washer 33 which lies in the groove 34 of stem 30 with lost motion longitudinally of the stem, that is to say, the washer 33 is approximately 1/32 inch less than the width of the groove 34. A spring 35 lies between the sleeve 31 and valve 29 so as to urge valve 29 toward its seat. When the parts are in the position of Fig. 1, the clearance at the point 36 between valve 29 and its seat is greater than the lost motion between valve 29 and stem 30, being about one-sixteenth inch. The spring 35 is stronger than the spring 32.

The operation of the device is as follows: With the parts in the position of Fig. 1, the thermostat 15 is cold, the portion 18b is in its left-hand position, valve 29 is open, valve 28 is closed and gas is being bled from chamber 10b through conduit 14 and openings 27 and 24 to conduit 26 whence it is led away to a point where it is burned, usually by a pilot flame. Thus the diaphragm valve 10 is opened to supply heat to the device which will heat up the thermostat 15. As the thermostat is heated lever 16 moves counterclockwise carrying the point 22 toward the point 18a. If it were not for the effect of spring 35 tending to move lever 18 in a clockwise direction, the snap acting device would reach a position of equilibrium when points 21, 18a and 22 were in line. However because of the effect of spring 35, the snap acting device reaches a position of equilibrium slightly before those three points are alined. In any case when the snap acting device has reached a position of equilibrium or balance, then if the thermostat 15 should happen to remain in that position for a while, the snap acting device might remain near an equilibrium position with consequent possibility of valves 28 and 29 being open at the same time. With my improved device the spring 32 positively seats the valve 28 at such a time when the snap acting device is in a substantially balanced central position. Upon further heating of the thermostatic element lever 16 carries point 22 farther to the right and the snap acting device moves beyond its central balanced position with the part 18b moving suddenly from the full line position of Fig. 1 to the dot-dash position there shown. Impelled by spring 35, valve 29 moves quickly toward the right causing washer 33 to engage the shoulder 30a at the right end of stem 30, whereupon valve 28 is lifted from its seat by the action of spring 35 overcoming the action of spring 32. Thus valves 28 and 29 are moved almost instantly from the position of Fig. 2 to that of Fig. 3, thus closing the escape of gas from chamber 10b to the outlet 26 and introducing gas from conduit 25 through casing means 17a and conduit 14 to the chamber 10b causing the diaphragm valve to close. These valves move so suddenly that there is practically no loss of gas during the instant valves 28 and 29 are both open. When the thermostat again cools the snap acting device returns to the position of Fig. 1, with the spring 35 holding valves 28 and 29 in their relative position on stem 30 as shown in Fig. 3 until valve 28 is seated and valve 29 is partly opened, after which further movement of the lever portion 18b fully opens valve 29 taking advantage of the lost motion connection between valve 29 and stem 30.

What I claim is:

1. Valve control mechanism comprising casing means having first and second valved openings alined in opposite walls of said casing means, two valves, one for each opening, said valves seating in opposite directions toward their respective openings, connecting means for said valves including a stem providing a lost motion connection permitting relative movement between said valves longitudinally of said stem, abutment means associated with said lost motion connection permitting one of said valves to be open when the other valve is closed and preventing both of said valves being closed at once, a lighter spring urging the valve at said first opening toward closed position, a heavier spring urging the valve at said second opening toward closed position, and an over-center snap acting device controlling said valve at said second opening, said device being adapted to move the said valve against the effect of said heavier spring.

2. Valve control mechanism comprising casing means having openings providing two valve seats, two valves respectively coacting with said seats, said valves closing toward their respective seats in opposite directions, a spring urging each valve toward its seat, a stem connecting said valves and compelling movement of said valves together, said stem being of such a length that when one valve is closed the other valve is open, one of said valves having a lost motion connection with said stem, an over-center spring-propelled snap acting device for causing opening and closing of said one valve, the lost motion in said lost motion connection being taken up when said one valve has moved that distance toward closed position corresponding to movement of said snap acting device to and slightly beyond center position as the device moves in valve-closing-causing direction, the spring associated with said one valve being stronger than the spring associated with the other valve, whereby the other of said valves will be held firmly seated by its spring until said snap device suddenly causes closing of said one valve and concurrent opening of said other valve.

CARLTON W. BONDURANT.